United States Patent
Lee et al.

(10) Patent No.: US 9,425,865 B2
(45) Date of Patent: Aug. 23, 2016

(54) WIRELESS CHIP FOR CHIP-TO-CHIP WIRELESS TRANSFER

(71) Applicant: SOONGSIL UNIVERSITY RESEARCH CONSORTIUM TECHNO-PARK, Seoul (KR)

(72) Inventors: Chang hyun Lee, Seoul (KR); Chang Kun Park, Gyeonggi-do (KR)

(73) Assignee: SOONGSIL UNIVERSITY RESEARCH CONSORTIUM TECHNO-PARK, Seoul (KR)

(*) Notice: Subject to any disclaimer, the term of this patent is extended or adjusted under 35 U.S.C. 154(b) by 25 days.

(21) Appl. No.: 14/569,801

(22) Filed: Dec. 15, 2014

(65) Prior Publication Data
US 2016/0049994 A1 Feb. 18, 2016

(30) Foreign Application Priority Data
Aug. 18, 2014 (KR) .......................... 10-2014-0106878

(51) Int. Cl.
*H04B 5/00* (2006.01)

(52) U.S. Cl.
CPC ........... *H04B 5/0081* (2013.01); *H04B 5/0031* (2013.01); *H04B 5/0037* (2013.01)

(58) Field of Classification Search
CPC combination set(s) only.
See application file for complete search history.

(56) References Cited

U.S. PATENT DOCUMENTS

| | | | | |
|---|---|---|---|---|
| 2008/0211455 A1* | 9/2008 | Park | ..................... | H02J 5/005 320/108 |
| 2009/0264069 A1* | 10/2009 | Yamasuge | ............... | H02J 5/005 455/41.1 |
| 2009/0271048 A1* | 10/2009 | Wakamatsu | ............ | G06F 1/266 700/296 |
| 2010/0084918 A1* | 4/2010 | Fells | ....................... | H02J 5/005 307/32 |
| 2010/0109443 A1* | 5/2010 | Cook | .................... | H01Q 1/2225 307/104 |
| 2010/0127660 A1* | 5/2010 | Cook | ..................... | H01Q 1/248 320/108 |
| 2010/0259109 A1* | 10/2010 | Sato | ........................ | H02J 17/00 307/104 |
| 2010/0270867 A1* | 10/2010 | Abe | ........................ | H02J 5/005 307/104 |
| 2011/0130093 A1* | 6/2011 | Walley | ............... | G06K 7/10207 455/41.1 |
| 2011/0133569 A1* | 6/2011 | Cheon | ..................... | H02J 17/00 307/104 |
| 2011/0148218 A1* | 6/2011 | Rozbicki | ................ | G02F 1/163 307/104 |
| 2012/0001497 A1* | 1/2012 | Sada | ....................... | H02J 5/005 307/104 |
| 2012/0155344 A1* | 6/2012 | Wiley | ................. | H04B 5/0025 370/310 |
| 2012/0274154 A1* | 11/2012 | DeLuca | .................. | H02J 17/00 307/149 |
| 2012/0326662 A1* | 12/2012 | Matsumoto | ............. | H02J 7/025 320/108 |
| 2013/0005252 A1* | 1/2013 | Lee | ....................... | H04B 5/0037 455/41.1 |
| 2013/0026981 A1* | 1/2013 | Van Der Lee | .......... | H02J 5/005 320/108 |
| 2013/0063083 A1* | 3/2013 | Park | ...................... | H02J 7/0013 320/108 |
| 2013/0234531 A1* | 9/2013 | Budgett | ............... | H04B 5/0075 307/104 |
| 2014/0073243 A1* | 3/2014 | Hijioka | ................ | H04B 5/0031 455/41.1 |

FOREIGN PATENT DOCUMENTS

KR 10-1392888 5/2014

* cited by examiner

*Primary Examiner* — Cindy Trandai
(74) *Attorney, Agent, or Firm* — Revolution IP, PLLC

(57) ABSTRACT

Provided is a wireless chip for chip-to-chip wireless transfer. A wireless chip for chip-to-chip wireless transfer according to the present invention includes: an antenna used as a wireless transfer path of data or power; a circuit unit providing information about whether there is input/output data; a mode control unit connected with the circuit unit and outputting a first or second level signal in accordance with whether there is input/output data; a data communication unit activated and inputting/outputting the data between the circuit unit and the antenna, only when the first level signal is inputted from the mode control unit; and a power relay unit activated and relays the power between the circuit unit and the antenna, only when the second level signal is inputted from the mode control unit.

3 Claims, 6 Drawing Sheets

(a)

(b)

(a)

(b)

(a)

(b)

WIRELESS CHIP FOR CHIP-TO-CHIP WIRELESS TRANSFER

CROSS-REFERENCE TO RELATED APPLICATIONS

This application claims the priority of Korean Patent Application No. 10-2014-0106878 filed on Aug. 18, 2014, in the Korean Intellectual Property Office, the disclosure of which is incorporated herein by reference.

BACKGROUND OF THE INVENTION

1. Field of the Invention

The present invention relates to a wireless chip for chip-to-chip wireless transfer, and more particularly, to a wireless chip for chip-to-chip wireless transfer that can wirelessly transmit and receive data and power.

2. Description of the Related Art

Recently, a study of 3D semiconductor technology for stacking a plurality of chips to reduce the area of an integrated circuit in the process of designing has been conducted. According to a TSV (Through Silicon Via) technology, which is a typical one, communication between chips is made by a via and a bump, unlike the existing MCP (Multi-Chip Package).

However, according to TSV technology, since the via is formed by forming a physical hole in a chip and filling the hole with a metallic material, there is a problem in that the research/development and commercialization costs increase due to the additional semiconductor process. Further, it takes much effort to increase the yield ratio of the via due to a problem like cracks. The TSV technology results in an increase in manufacturing cost.

In order to solve those problems, recently, a technology of chip-to-chip wireless communication has been intensively studied. FIG. 1 is a diagram illustrating the concept of a chip-to-chip wireless communication technology according to the related art. The chips stacked each have an antenna for wireless data transfer between them. In FIG. 1, the antennas of the chips are inductors that induce inductive coupling.

Communication between the stacked chips is made by inductive coupling generated by induct-typed pads. However, such chip-to-chip wireless communication has a problem in that it is difficult and troublesome to supply power to the stacked chips. Accordingly, a method of capable of wirelessly supplying not only data, but power has been studied in recent years.

In order to achieve wireless transmission/reception of data and power, basically, there is a need for an antenna for wireless transfer of power and an antenna for wireless transfer of data for the chip on each layer.

FIG. 2 illustrates an example of a 3D semiconductor having a stacked structure for wirelessly supplying power. For the convenience of description, it is assumed that the pads at the left of the chips are power antennas and the pads at the right are data antennas. The function of wireless transmission/reception of data using an antenna is generally known in the art, so wireless transfer of power is described hereafter.

For wireless transfer of power between chips, in a plurality of stacked chips, the power antenna of the highest chip has only to have a function of transmitting power, the power antenna of the lowest chip has only to have a function of receiving power, and the antennas of the other chips between them has both functions of transmitting and receiving power.

Obviously, the functions of the highest chip and the lowest chip may be changed. The principle of wireless power supply is as follows.

First, the highest chip receives DC power through a wire from the outside, converts it into AC power, and transmits the AC power to the antenna of the chip under itself through its power antenna. The chip receiving the AC power wirelessly transmits the power to the chip under itself through its antenna, such that the power is wirelessly supplied to the lowest chip in this way. The chips convert the AC power received through their antenna back into DC power and use it as power for activating themselves.

However, since one chip has two antennas for transferring data and power, the integrated circuit becomes large and complicated, so the manufacturing cost increases.

The background of the present invention has been disclosed in Korean Patent No. 1392888 (May 8, 2014).

SUMMARY OF THE INVENTION

An aspect of the present invention provides a wireless chip for chip-to-chip wireless transfer that can greatly decrease the entire size of an integrated circuit and reduce its manufacturing cost by allowing for wireless transmission/reception of data and power through one antenna.

According to an aspect of the present invention, there is provided a wireless chip for chip-to-chip wireless transfer that includes: an antenna used as a wireless transfer path of data or power; a circuit unit providing information about whether there is input/output data; a mode control unit connected with the circuit unit and outputting a first or second level signal in accordance with whether there is input/output data; a data communication unit activated and inputting/outputting the data between the circuit unit and the antenna, only when the first level signal is inputted from the mode control unit; and a power relay unit activated and relays the power between the circuit unit and the antenna, only when the second level signal is inputted from the mode control unit.

The power relay unit may be a power reception unit receiving AC power that the antenna has wirelessly received, converting the AC power into DC power, and supplying the DC power to the circuit unit.

The power relay unit may be a power transmission unit converting DC power supplied from the circuit unit into AC power and transmitting the AC power to the antenna to allow for wireless power transmission through the antenna.

A first terminal of the circuit unit may be connected with a first terminal of the mode control unit, a second terminal of the mode control unit may be connected to a node between a first terminal of the data communication unit and a first terminal of the power relay unit, the data communication unit may have a second terminal connected with a second terminal of the circuit unit and a third terminal connected to the antenna, and the power relay unit may have a second terminal connected with a third terminal of the circuit unit and a third terminal connected to the antenna.

According to another aspect of the present invention, there is provided a wireless chip for chip-to-chip wireless transfer that includes: an antenna used as a wireless transfer path of data or power; a circuit unit providing information about whether there is input/output data and information about a request for transmitting/receiving power; a mode control unit having a first terminal connected with the circuit unit, outputting a first signal having a first level or a second signal having a second level through a second terminal in accordance with whether there is input/output data, and outputting the first signal or the second signal through a third terminal in accordance with a request for transmitting or receiving power; a data communication unit activated and inputting/outputting the data between the circuit unit and the antenna, only when the first signal is inputted through the second terminal; a power reception unit activated and supplying power, which the antenna has wirelessly received, to the circuit unit, between the circuit unit and the antenna, only when both of the second signal and the first signal are inputted through the second terminal and the third terminal, respectively; and a power transmission unit activated and relaying power, which is supplied from the circuit unit, to the antenna, between the circuit unit and the antenna.

The power reception unit may receive AC power that the antenna has wirelessly received, convert the AC power into DC power, and supply the DC power to the circuit unit, and the power transmission unit may convert DC power supplied from the circuit unit into AC power and transmit the AC power to the antenna to allow for wireless power transmission through the antenna.

A first terminal of the circuit unit may be connected with a first terminal of the mode control unit, the mode control unit may be a second terminal connected to a node of first terminals of the data communication unit, the power reception unit, and the power transmission unit, and a third terminal connected to a node between second terminals of the power reception unit and the power transmission unit, the data communication unit may have a second terminal connected with a second terminal of the circuit unit and a third terminal connected to the antenna, and the power reception unit and the power transmission unit each may have a third terminal connected to a third terminal of the circuit unit and a fourth terminal connected to the antenna.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Hereinafter, embodiment of the present invention will be described in detail with reference to the accompanying drawings for those skilled in the art to be able to easily accomplish the present invention.

The present invention relates to a wireless chip for chip-to-chip wireless transfer and provides a technique of enabling one antenna to wirelessly transmit/receive data and power, in each of chips included in a 3D semiconductor.

In the embodiments of the present invention, antennas for wireless transmission/reception of data are used for antennas for wireless transmission/reception of power, too. Antennas are configured to wirelessly transmit/receive data when there is a need for transmitting/receiving data and also to wirelessly transmit or receive power in a standby mode without transmission/reception of data. Hereafter, the embodiments of the present invention are described in detail.

Figure 3:
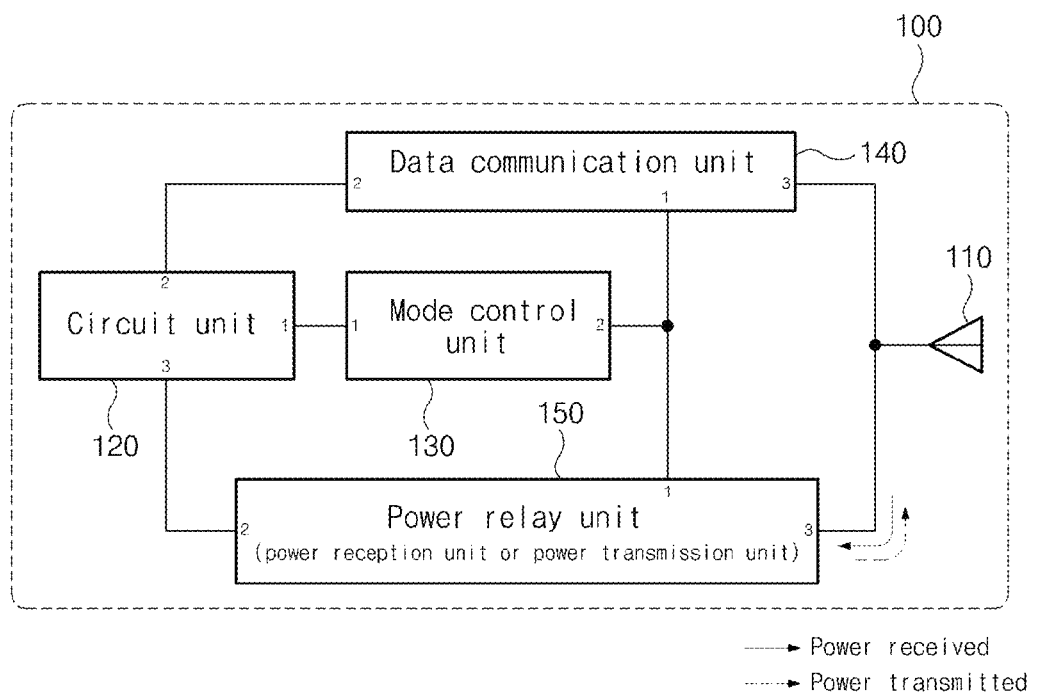
FIG. 3 is a diagram illustrating the configuration of a wireless chip for chip-to-chip wireless transfer according to a first embodiment of the present invention.

FIG. 3 is a diagram illustrating the configuration of a wireless chip for chip-to-chip wireless transfer according to a first embodiment of the present invention. A wireless chip 100 according to an embodiment of the present invention can selectively transmit/receive data and receive power or selectively transmit/receive data and transmit power through one antenna 110.

The first embodiment is available for a chip performing any one function of transmission and reception of power in chips of a 3D semiconductor. For example, in FIG. 2, it may be used for the highest chip having only the function of transmitting power or the lowest chip having only the function of receiving power. Obviously, the chip is not necessarily used only for them.

The wireless chip 100 for chip-to-chip wireless communication according to the first embodiment of the present invention includes an antenna 110, a circuit unit 120, a mode control unit 130, a data communication unit 140, and a power relay unit 150.

First, the antenna 110 is used as a wireless transfer path for data or power.

The circuit unit 120 creates and provides information on whether there is input/output data to the mode control unit 130. To this end, a first terminal of the circuit unit 120 is connected with a first terminal of the mode control unit 130.

The mode control unit 130 outputs a first level or second level signal (binary data) in accordance with whether there is input/output data. In this embodiment, when a first level signal is High ('1'), the second level signal exhibits Low ('0'), and when the first level signal is Low, the second level signal exhibits High.

In the following description, it is assumed that the first level signal is High and the second level signal is Low, for the convenience of description. That is, it is assumed that when there is data to input/output, High is outputted from the binary data, and when there is no data to input/output, Low is outputted.

A second terminal of the mode control unit 130 is connected to the node between a first terminal of the data communication unit 140 and a first terminal of the power relay unit 150. Accordingly, a signal outputted through the second terminal of the mode control unit 130 is inputted to both of the first terminal of the data communication unit 140 and the first terminal of the power relay unit 150.

The mode control unit 130 provides signals for activating/deactivating the data communication unit 140 and the power relay unit 150. When a first level signal (for example, High) is outputted from the mode control unit 130, the data communication unit 140 is activated, while the power relay unit 150 is deactivated, and when a second level signal (for example, Low) is outputted, the data communication unit 140 is deactivated, while the power relay unit 150 is activated.

Accordingly, only when the first level signal (for example, High) is inputted from the mode control unit 130, the data communication unit 140 is activated and can input/output the data between the circuit unit 120 and the antenna 110.

A second terminal of the data communication unit 140 is connected to the second terminal of the circuit unit 120 and a third terminal is connected to the antenna 110. Accordingly, it can input/output data between the circuit unit 120 and the antenna 110, when it is activated.

On the other hand, only when the second level signal (for example, Low) is inputted from the mode control unit 130, the power relay unit 150 is activated and transmits the power between the circuit unit 120 and the antenna 110.

A second terminal of the power relay unit 150 is connected to a third terminal of the circuit unit 120 and a third terminal is connected to the antenna 110. Accordingly, it can receive or transmit power between the circuit unit 120 and the antenna 110, when it is activated.

When the power relay unit 150 functions as a power reception unit, the power relay unit 150 receives AC power that the antenna 110 has wirelessly received from the outside (for example, upper or lower chip), converts it into DC power, and supplies the DC power to the circuit unit 120.

In contrast, when the power relay unit 150 functions as a power transmission unit, the power relay unit 150 converts DC power supplied from the circuit unit 120 into AC power and transmits it to the antenna 110, so that power can be wirelessly transmitted to the outside (for example, upper or lower chip) through the antenna 110.

According to this configuration, the antenna 110 can not only wirelessly transmit/receive data, but wirelessly transmit/receive power.

Figure 4:
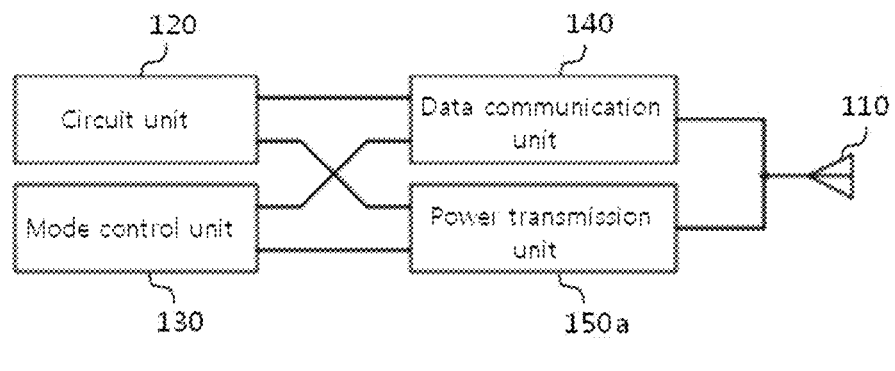
FIGS. 4 to 5 are diagrams simply illustrating the concept of operation of the chip illustrated in FIG. 3.
Figure 4:
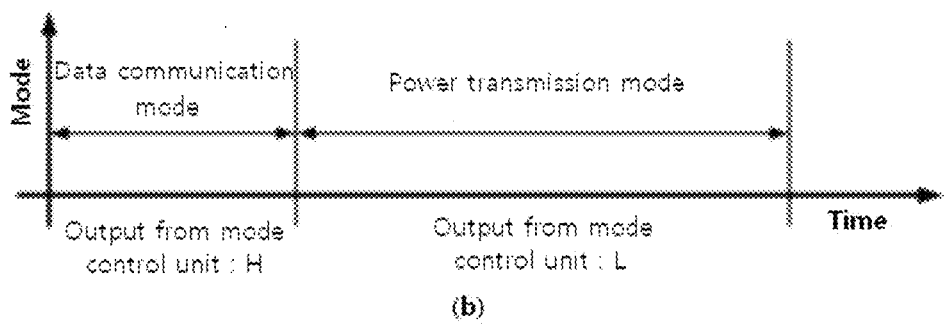
Figure 5:
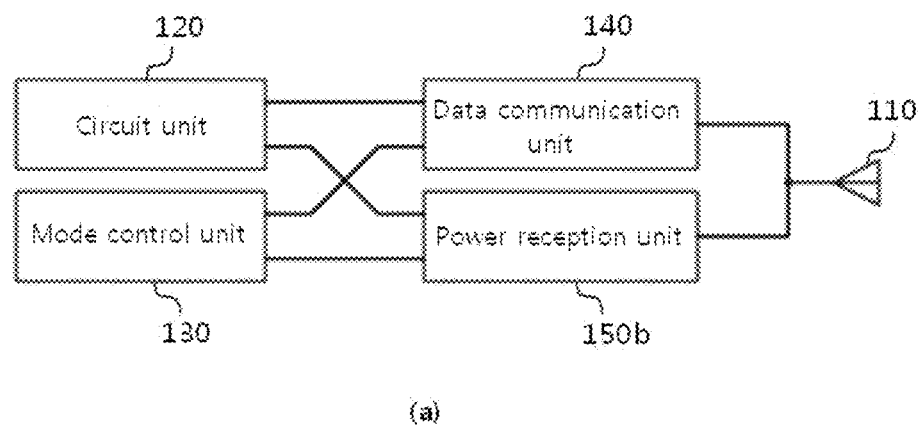
Figure 5:
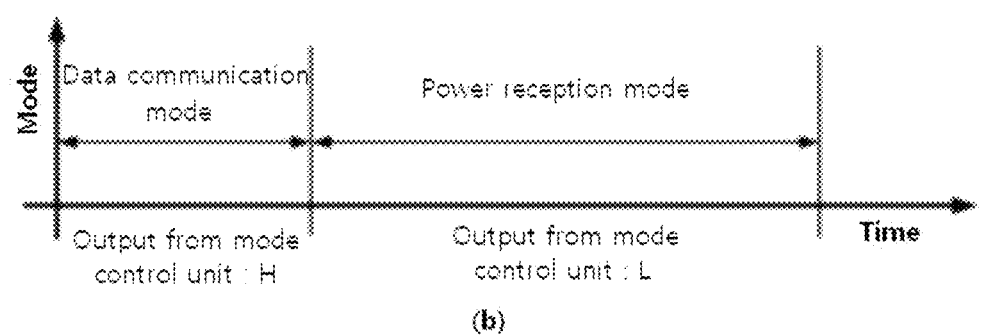

FIGS. 4 to 5 are diagrams simply illustrating the concept of operation of the chip illustrated in FIG. 3. The power relay unit 150 functions as a power transmission unit in FIG. 4 and as a power reception unit in FIG. 5.

(a) of FIGS. 4 and 5 are block diagrams corresponding to FIG. 3 and (b) of FIGS. 4 and 5 illustrate examples of mode conversion to time. One antenna 110 is connected to the data communication unit 140 and a power transmission unit 150a in (a) of FIG. 4, and one antenna 110 is connected to the data communication unit 140 and a power reception unit 150b in (a) of FIG. 5.

First, (a) of FIG. 4 is a block diagram when there is no need for wireless reception of power. As illustrated in (b) of FIG. 4, when a High signal is outputted from the mode control unit 130, the power transmission unit 150a is deactivated and the data communication unit 140 is activated, so a data transmission/reception mode is started. Thereafter, when a Low signal is outputted from the mode control unit 130, the data communication unit 140 is deactivated and the power transmission unit 150a is activated, so a power transmission mode is started.

(a) of FIG. 5 is a block diagram when there is no need for wireless transmission of power. In the case illustrated in FIG. 5, the same principle as in FIG. 4 is applied and a power reception mode is performed instead of the power transmission mode.

Figure 6:
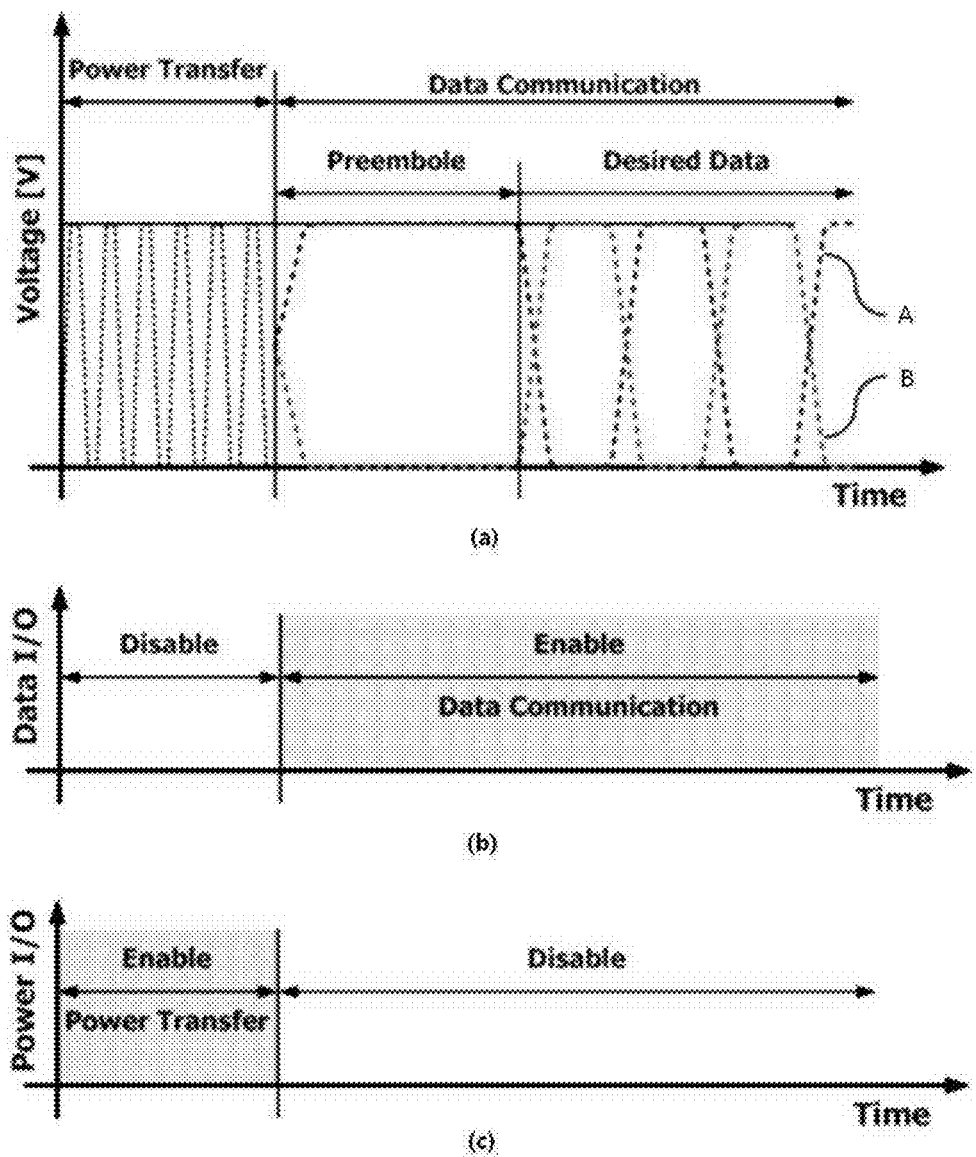
FIG. 6 is diagrams illustrating in detail transmission/reception of power and data of the chip illustrated in FIG. 3.

FIG. 6 is diagrams illustrating in detail transmission/reception of power and data of the chip illustrated in FIG. 3. (a) to (c) of FIG. 6 illustrate the voltage of an antenna, the information about activation of the data communication unit, the information about activation of the power relay unit, according to elapse of time.

First, there is no data to input/output, the mode control unit 130 outputs a Low signal. Accordingly, the data communication unit 140 is disabled in response to the Low signal. In this case, output from the data communication unit 140 is not transmitted to the antenna 110.

On the other hand, the power relay unit 150 is enabled and relays power in response to the Low signal from the mode control unit 130. The antenna 110 transmits AC power in the section of power transfer.

Next, there is data to input/output, the mode control unit 130 outputs a High signal. Obviously, the High signal may have a meaning that includes a preembole signal at the front period saying there is a signal. The data communication unit 140 is enabled and can transmit/receive data through the antenna 110. On the other hand, the power relay unit 150 is disabled and cannot relay power.

In (a) of FIG. 6, two signals A and B illustrated in the section of data communication mean differential signals, which corresponds to the case when an internal digital circuit has a differential structure.

According to the embodiment having this configuration of the present invention, wireless power transmission is performed the antenna (or coil) for wireless data transmission/reception as in the related art, but wireless power transmission/reception can be performed through the antenna for wireless data transmission/reception instead of wireless data transmission/reception in the section without data transmission/reception, so it is possible to reduce the number of antennas (or coils) for wireless power transmission or remove them all.

Figure 1:
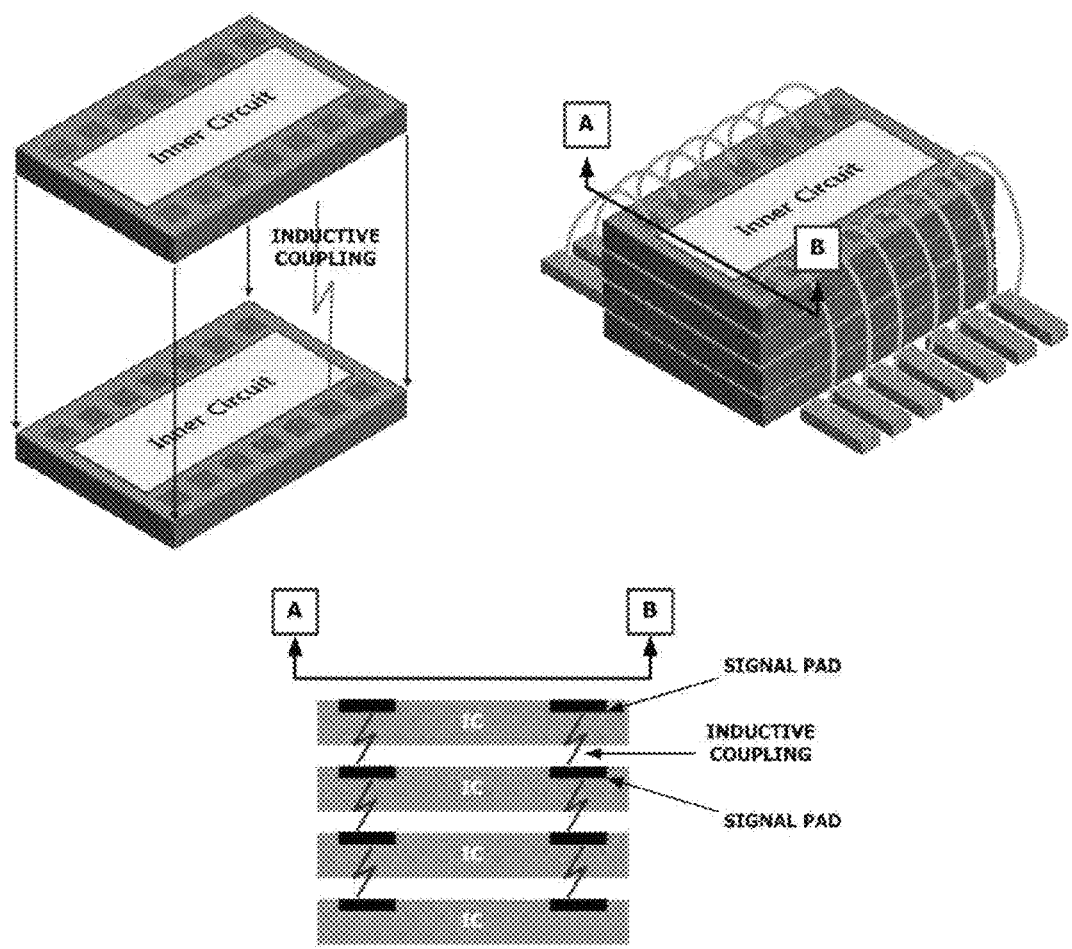
FIG. 1 is a diagram illustrating the concept of a chip-to-chip wireless communication technology according to the related art.
Figure 2:
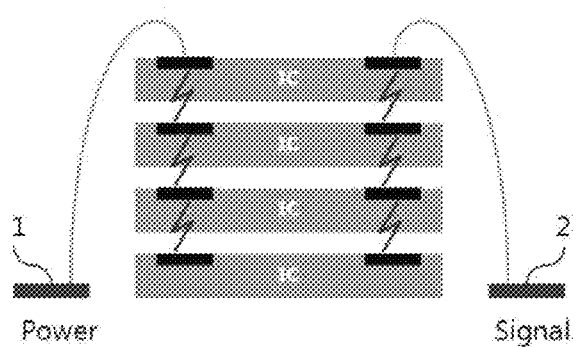
FIG. 2 illustrates an example of a 3D semiconductor having a stacked structure for wirelessly supplying power.
Figure 7:
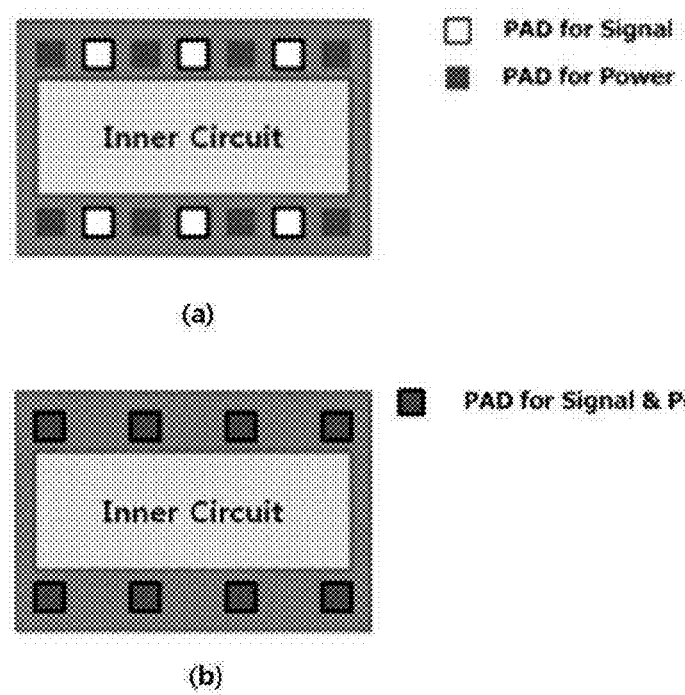
FIG. 7 is diagrams illustrating an example of comparing the configurations of antenna pads of the 3D semiconductor illustrated in FIG. 2 and according to an embodiment of the present invention.

FIG. 7 is diagrams illustrating examples of comparing the configurations of antenna pads of the 3D semiconductor illustrated in FIG. 2 and according to an embodiment of the present invention. As illustrated in (a) of FIG. 7, it is required to separately providing antenna (PAD for Signal) for wireless data transmission/reception and antennas (PAD for Power) for wireless power transmission/reception in one chip in the related art.

A digital integrated circuit IC usually has a plurality of transceivers, and similarly, as in (a) of FIG. 7, a plurality of transmission/reception antenna pads may be provided in one integrated circuit (chip) in a 3D semiconductor having the function of chip-to-chip wireless communication. However, in the configuration of the related art illustrated in (a) of FIG. 7, it is required to separately dispose pads for transmitting/receiving signals and pads for transmitting/receiving power.

However, in the configuration illustrated in (b) of FIG. 7 according to this embodiment, an antenna for wireless data transmission/reception can be used for wireless power transmission/reception, that is, wireless data transmission/reception and wireless power transmission/reception can be performed by one antenna, so the number of necessary pads can be reduced to the half at the maximum. As the number of pads reduces, the area of the entire chip (integrated circuit) can also be reduced, so the manufacturing cost can be reduced.

Figure 8:
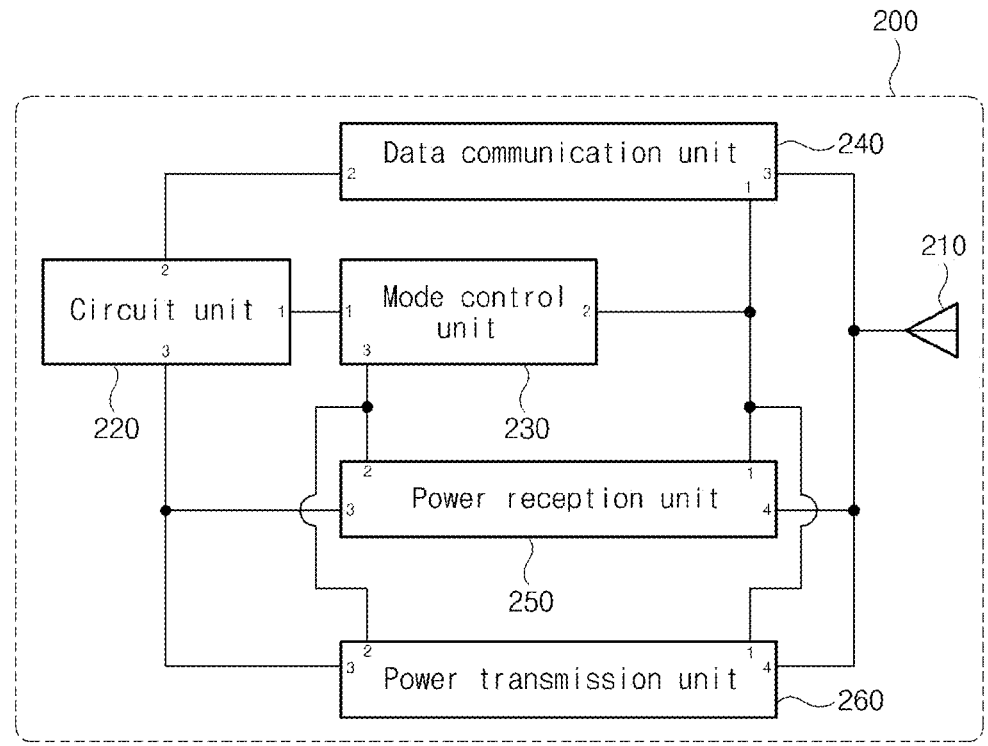
FIG. 8 is a diagram illustrating the configuration of a wireless chip for chip-to-chip wireless transfer according to a second embodiment of the present invention.

FIG. 8 is a diagram illustrating the configuration of a wireless chip for chip-to-chip wireless transfer according to a second embodiment of the present invention. The second embodiment has conception similar to that of the first embodiment. That is, the wireless chip of the second embodiment can selectively transmit/receive data, receive power, and transmit power through one antenna.

The second embodiment is available for a chip performing both of transmission and reception of power in chips of a 3D semiconductor. For example, it can be used for the middle chip having both functions of transmission and reception power in FIG. 2. Obviously, the chip is not necessarily used only for it.

The wireless chip 200 for chip-to-chip wireless communication according to the second embodiment of the present invention includes an antenna 210, a circuit unit 220, a mode control unit 230, a data communication unit 240, a power reception unit 250, and a power transmission unit 260.

First, the antenna 210 is used as a wireless transfer path for data or power.

The circuit unit 220 provides the information about whether there is input/output data and whether there is a request for transmitting/receiving power to the mode control unit 230. To this end, a first terminal of the circuit unit 220 is connected with a first terminal of the mode control unit 230.

The mode control unit 230 outputs a first signal (for example, High) having a first level or a second signal (for example, Low) having a second level through a second terminal in accordance with whether there is input/output data and outputs the first signal (for example, High) or the second signal (for example, Low) through a third terminal in response to a request for receiving or transmitting power.

That is, the mode control unit 230 outputs binary data based on whether there is input/output through the second terminal. For example, when there is data to input/output, it outputs a first signal (for example, High) through the second terminal, or when it is not, it outputs a second signal (for example, Low).

Further, the mode control unit 230 outputs binary data based a request for receiving or transmitting power through the third terminal. For example, when there is a request for receiving power, it outputs a first signal (for example, High) through the third terminal, or when it is not, it outputs a second signal (for example, Low).

The second terminal of the mode control unit 230 is connected to the node among the first terminals of the data communication unit 240, the power reception unit 250, and the power transmission unit 260. Accordingly, a signal outputted through the second terminal of the mode control unit 230 is inputted to all of the first terminal of the data communication unit 240, the first terminal of the power reception unit 250, and the first terminal of the power transmission unit 260.

Further, the third terminal of the mode control unit 230 is connected to the node between the second terminals of the power reception unit 250 and the power transmission unit 260. Accordingly, a signal outputted through the third terminal of the mode control unit 230 is inputted to both of the second terminal of the power reception unit 250 and the second terminal of the power transmission unit 260.

The mode control unit 230 determines to activate/deactivate the data communication unit 240, the power reception unit 250, and the power transmission unit 260, using the signal outputted through the second terminal and the third terminal.

When a first signal (for example, High) is outputted through the second terminal of the mode control unit 230, the data communication unit 240 is activated, while the power reception unit 250 and the power transmission unit 260 are deactivated. Whether to activate the data communication unit 240 or not is determined on the basis of only the signal at the second terminal, regardless of the signal outputted through the third terminal.

On the contrary, when a second signal (for example, Low) is outputted through the second terminal of the mode control unit 230, the data communication unit 240 is deactivated. Whether to activate the power reception unit 250 and the power transmission unit 260 or not is determined on the basis of the signal at the third terminal of the mode control unit 230. That is, when the signal at the third terminal of the mode control unit 230 is a first signal (for example, High), the power reception unit 250 is activated, and when it is a second signal (for example, Low), the power transmission unit 260 is activated.

That is, only when the first signal (for example, High) is inputted through the second terminal of the mode control unit 230, the data communication unit 240 is activated and can input/output the data between the circuit unit 220 and the antenna 210. The data communication unit 240 has a second terminal connected with the second terminal of the circuit unit 220 and a third terminal connected to the antenna 210, so it can input/output data between the circuit unit 220 and the antenna 210, when it is activated.

Only when a second signal (for example, Low) and a first signal (for example, High) are both inputted from the second terminal and the third terminal of the mode control unit 230, respectively, the power reception unit 250 is activated and can supply power that the antenna 210 has wirelessly received to the circuit unit 220, between the circuit unit 220 and the antenna 210.

A third terminal of the power reception unit 250 is connected to the third terminal of the circuit unit 220 and a fourth terminal is connected to the antenna 210. Accordingly, it can receive power between the circuit unit 220 and the antenna 210, when it is activated. That is, the power reception unit 250 receives AC power that the antenna has wirelessly received, converts it into DC power, and supplies the DC power to the circuit unit 220.

Only when a second signal (for example, Low) and a second signal (for example, Low) are both inputted from the second terminal and the third terminal of the mode control unit 230, respectively, the power transmission unit 260 is activated and can supply power, which is supplied from the circuit unit 220, to the antenna 210, between the circuit unit 220 and the antenna 210.

A third terminal of the power transmission unit 260 is connected to the third terminal of the circuit unit 220 and a fourth terminal is connected to the antenna 210. Accordingly, it can transmit power between the circuit unit 220 and the antenna 210, when it is activated. That is, the power transmission unit 260 converts DC power supplied from the circuit unit 220 into AC power and transmits it to the antenna 210, so wireless power transmission through the antenna 210 becomes possible.

Figure 9:
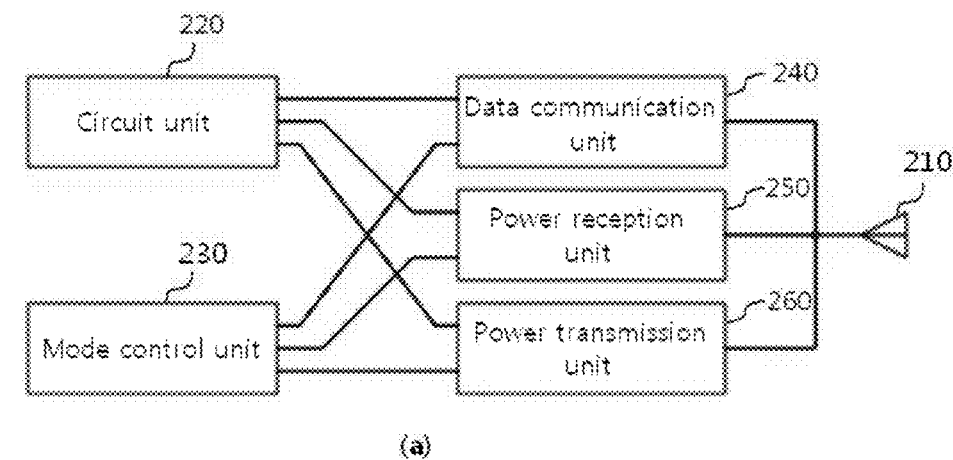
FIG. 9 is diagrams simply illustrating the concept of operation of the chip illustrated in FIG. 8.
Figure 9:
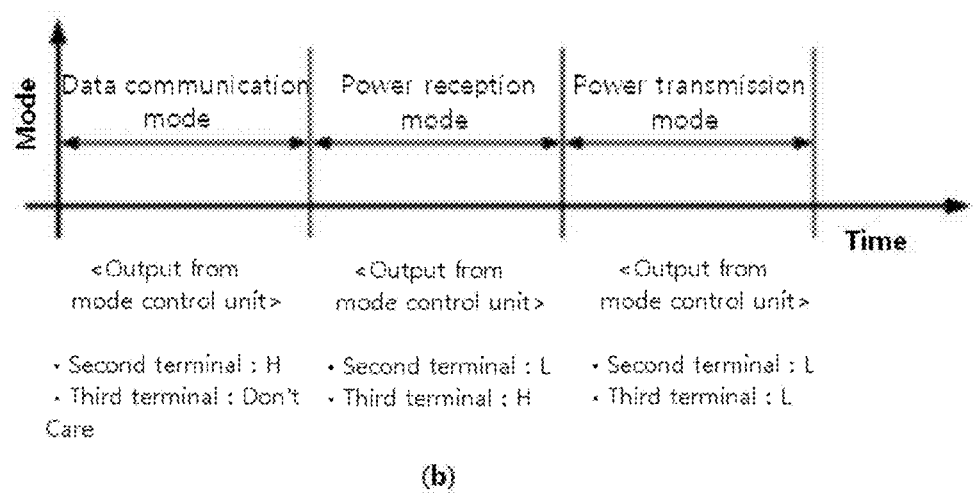

FIG. 9 is diagrams simply illustrating operation of the chip illustrated in FIG. 8. (a) of FIG. 9 is a block diagram simply illustrating the configuration of the chip illustrated in FIG. 8 and (b) of FIG. 9 is an example of mode conversion to time.

As in (a) of FIG. 9, one antenna 210 is connected with the data communication unit 240, the power reception unit 250, and the power transmission unit 260. As illustrated in (b) of FIG. 9, when a High signal is outputted through the second terminal of the mode control unit 230, the power reception unit 250 and the power transmission unit 260 are deactivated and only the data communication unit 240 is activated, so a data transmission/reception mode is started. Thereafter, when a Low signal is outputted through the second terminal of the mode control unit 230, the data communication unit 240 is deactivated. However, whether to activate the power reception unit 250 and the power transmission unit 260 or not is determined on the basis of the signal at the third terminal of the mode control unit 230.

That is, when a Low signal is outputted through the second terminal and a High signal is outputted through the third terminal of the mode control unit 230, the power transmission unit 260 is deactivated and the power reception unit 250 is activated, a power reception mode is started. Further, when a Low signal is outputted through the second terminal and a Low signal is also outputted through the third terminal of the mode control unit 230, the power reception unit 250 is deactivated and the power transmission unit 260 is activated, a power transmission mode is started.

As described above, in the second embodiment, the power reception unit 250 and the power transmission unit 260 are deactivated when data is wirelessly transmitted/received, and the power reception unit 250 and the power transmission unit 260 are selectively activated when data is not wirelessly transmitted/received, such that one antenna can wirelessly transmit/receive power and wirelessly transmit/receive data, too.

According to the wireless chip for chip-to-chip wireless transfer of the present invention, since one antenna can wirelessly transmit/receive both of data and power, it is possible to reduce the size of an additional antenna for wireless power transfer or remove all of additional antenna. Therefore, according to the present invention, it is possible to reduce the entire size of a wireless integrated circuit for chip-to-chip wireless transfer and to decrease the manufacturing cost.

As set forth above, according to exemplary embodiments of the invention, since one antenna can wirelessly transmit/receive both of data and power, it is possible to reduce the size of an additional antenna for wireless power transfer or remove all of additional antenna. Therefore, according to the present invention, it is possible to reduce the entire size of a wireless integrated circuit for chip-to-chip wireless transfer and to decrease the manufacturing cost.

While the present invention has been illustrated and described in connection with the exemplary embodiments, it will be apparent to those skilled in the art that modifications and variations can be made without departing from the spirit and scope of the invention as defined by the appended claims.

What is claimed is:

1. A wireless chip for chip-to-chip wireless transfer, comprising:
   an antenna used as a wireless transfer path of data or power;
   a circuit unit providing information about whether there is input/output data and information about a request for transmitting/receiving power;
   a mode control unit having a first terminal connected with the circuit unit, outputting a first signal having a first level or a second signal having a second level through a second terminal in accordance with whether there is input/output data, and outputting the first signal or the second signal through a third terminal in accordance with a request for transmitting or receiving power;
   a data communication unit activated and inputting/outputting the data between the circuit unit and the antenna, only when the first signal is inputted through the second terminal;
   a power reception unit activated and supplying power, which the antenna has wirelessly received, to the circuit unit, between the circuit unit and the antenna, the power reception unit being activated in response to detection of the second signal of the second terminal of the mode control unit and the first signal of the third terminal of the mode control unit; and
   a power transmission unit activated and relaying power, which is supplied from the circuit unit, to the antenna, between the circuit unit and the antenna, the power transmission unit being activated in response to detection of the second signal of the second terminal of the mode control unit and the second signal of the third terminal of the mode control unit.

2. The wireless chip of claim 1, wherein the power reception unit receives AC power that the antenna has wirelessly received, converts the AC power into DC power, and supplies the DC power to the circuit unit, and the power transmission unit converts DC power supplied from the circuit unit into AC power and transmits the AC power to the antenna to allow for wireless power transmission through the antenna.

3. The wireless chip of claim 1, wherein a first terminal of the circuit unit is connected with a first terminal of the mode control unit, the mode control unit has a second terminal connected to a node of first terminals of the data communication unit, the power reception unit, and the power transmission unit, and a third terminal connected to a node between second terminals of the power reception unit and the power transmission unit, the data communication unit has a second terminal connected with a second terminal of the circuit unit and a third terminal connected to the antenna, and the power reception unit and the power transmission unit each have a third terminal connected to a third terminal of the circuit unit and a fourth terminal connected to the antenna.

* * * * *